United States Patent [19]

Chiesa

[11] 4,139,292
[45] Feb. 13, 1979

[54] PHOTOGRAPHIC APPARATUS FOR PRODUCING AN IDENTITY CARD

[75] Inventor: Luigi Chiesa, Turin, Italy

[73] Assignee: Morenar S.A., Friborg, Switzerland

[21] Appl. No.: 796,364

[22] Filed: May 12, 1977

[30] Foreign Application Priority Data

Sep. 10, 1976 [IT] Italy .............................. 69195 A/76

[51] Int. Cl.² ............................................ G03B 17/24
[52] U.S. Cl. .................................... 354/109; 354/105; 354/110; 354/211
[58] Field of Search ............... 354/105, 109, 110, 118, 354/211

[56] References Cited

U.S. PATENT DOCUMENTS 4,011,570   3/1977   Stievenart et al. ..................... 354/109

Primary Examiner—Russell E. Adams
Attorney, Agent, or Firm—Remy J. VanOphem

[57] ABSTRACT

A camera for automatically producing an identity card entirely photographically with writing and a picture of the person on the card, can selectively either photograph the actual person or a picture of the person, so that it is not necessary for the person to be present if that person can furnish a photograph. The camera feeds roll film to a first exposure station where borders are produced by exposure to saturation light, then to a second exposure station for photographing the writing and, optionally, the photograph of the person, then to a third exposure station for the optional photograph of the actual person. The second exposure station has a selectively operable mask for shielding part of the film from light if the third exposure station is to be used for photographing the actual person.

12 Claims, 5 Drawing Figures

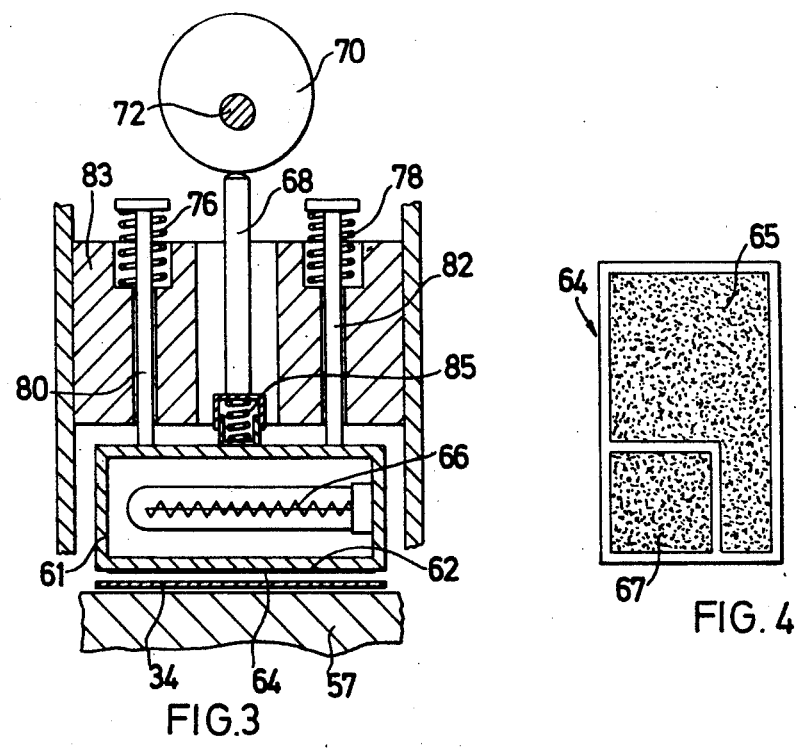
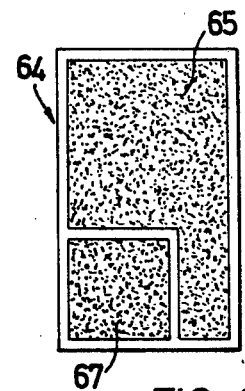
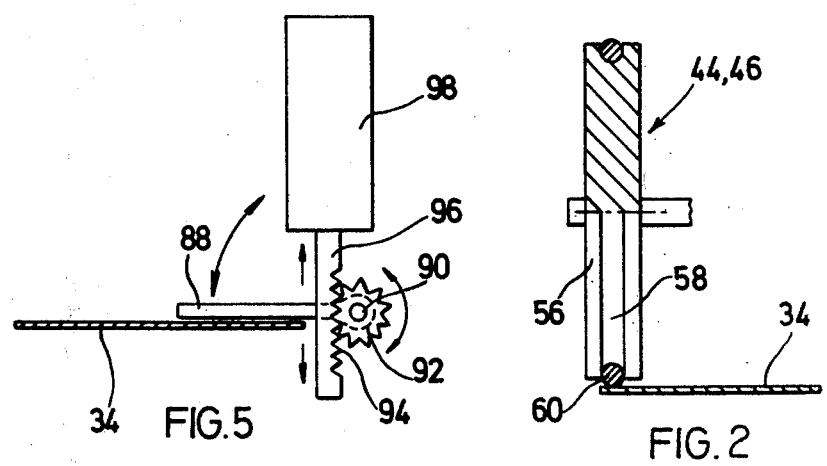

PHOTOGRAPHIC APPARATUS FOR PRODUCING AN IDENTITY CARD

BACKGROUND OF THE INVENTION

1. Field of the Invention

This invention relates to photographic apparatus for producing an identity card on photosensitive material with alphanumeric data photographed from a data-bearing card and with a photographed picture of a person.

A preferred application of the invention is to such a photographic apparatus adapted and arranged to operate automatically in cooperation with an installation for immediate treatment of exposed photosensitive material in order to automatically deliver a finished card in a few minutes from the beginning of the operations. An installation of the above described type particularly suitable to cooperate with a camera in accordance with the present invention is that described in the Italian Patent Application No. 67 859-A/76 filed on 13th April 1976 in the name of Osvando Fasano.

2. Description of Prior Art

Automatic photographic apparatus for preparing identity cards or tickets with a photograph are known, in which a photograph of the owner of the card is reproduced on a sheet or coupon of pre-exposed photosensitive material together with graphical information such as name and address of the owner, the authority issuing the card, the series number of the card, etc., thereby providing an identity card incorporating all data including a photo on a single support either for convenience or for warranty against forgery.

The known apparatus, however, require in general the presence of the owner of the card in the place where the card is being prepared, which is sometimes inconvenient, for example because long distances must be covered by the owner. This is the case, for example, with subscription to associations and clubs where transactions can take place either upon visiting the offices of the association or by post, or even in the case of identity cards for internal use in firms where the main offices are equipped with the camera and one or more branches are located far away from them and the apparatus is not available.

Another problem arising in the preparation of a card of this type when the photographic material which is going to constitute the card is moved forward by automatic conveying means though the various treatment steps is that a finished card often has irregular, smudge edges and/or edges with non-uniform colouring either on the external contour or on the limit between the photo of the owner of the card and alphanumeric indications provided on the card, e.g. owing to irregularities in the forwards movement and/or even slight phase displacements between exposure, cutting and the like operations.

SUMMARY OF THE INVENTION

According to the invention there is provided a photographic apparatus for producing an identity card on photosensitive material with alphanumeric data photographed from a data-bearing card and with a picture of a person photographed selectively either from the actual person or from an existing photograph of the person, the apparatus comprising means for positioning said data-bearing card and for positioning said existing photograph, means for illuminating the data-bearing card and the existing photograph, means for producing images of the data-bearing card and of the existing photograph respectively on first and second predetermined portions of the photosensitive material and for controlling exposure of the photosensitive material to said images, selectively operable means to mask said second predetermined portion of the photosensitive material from any exposure to light during exposure of said first predetermined portion of the photosensitive material to the image of the data-bearing card, means for producing an image of the actual person on said second predetermined portion of the photosensitive material, and selectively operable means for producing a controlled exposure of said second predetermined portion of the photosensitive material to said image of the actual person.

BRIEF DESCRIPTION OF THE DRAWINGS

FIG. 2 shows a detail, in a partial cross-section, of a tape forwarding roller which is a part of the camera of FIG. 1;

FIG. 3 shows a cross-sectional view of a preliminary exposure device for the photosensitive material, the device being part of the camera of FIG. 1;

FIG. 4 is a plan view from below of a pressure illuminator being part of the device of FIG. 3;

FIG. 5 shows a cross-sectional view of a masking device belonging to the camera of FIG. 1.

DETAILED DESCRIPTION OF THE PREFERRED EMBODIMENT

Figure 1:
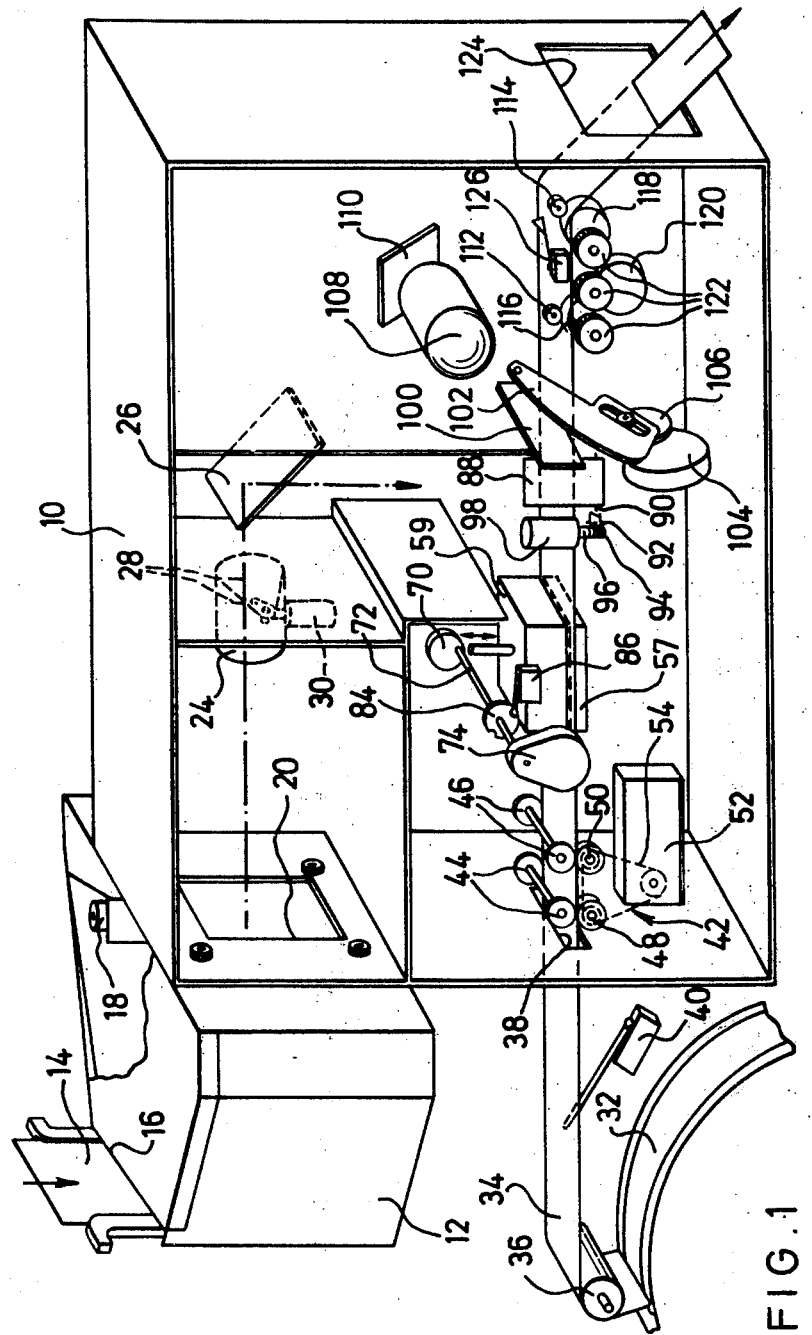
FIG. 1 is a perspective view of a camera according to the invention, where the front and a side wall have been removed.

With reference to FIG. 1, the camera according to the invention comprises a main housing 10 which is light tight and to which a second housing or box 12 is fixed which is designed to support and illuminate an alphanumeric data-bearing card 14 inserted into a slot 16. The box 12 is designed to keep the card 14 in a predetermined position and can be illuminated by means of bulbs such as the lamp 18 within the box. An opening 20 in the side wall of the housing 10 makes it possible for an objective 24 inside the housing 10 to receive an image of the card 14 and to project it onto an oblique mirror 26 where the image is vertically reflected downwards towards a first exposure station, as described below. The objective 24 has a shutter 28 which can be operated by an electromagnetic solenoid device 30.

Beneath the support and illumination box 12, a magazine 32 is fixed to the main housing 10 and contains a roll of photosensitive film or tape 34, such as resersible paper, which is taken off the magazine and passes around an idler roller 36 and enters the housing 10 through a slot 38. A microswitch 40 is located close to the slot 38 and is in contact with the film 34 so that when the end of the film 34 leaves the magazine to enter the slot 38, i.e. when the roll is terminated, the microswitch 40 generates a signal to cut off the operation of the camera. The microswitch 40 is located in such a manner as to stop the operation of the camera while the end of the film 34 is still outside the slot 38, thereby making it possible to attach the leading end of a new roll of film (not shown) to it, and to withdraw the final length of film and at the same time feed the new film through the camera, and to start the operation of the camera again with the new roll in the magazine with no need for the camera to be opened.

Within the housing 10, the film 34 is engaged by a first forwarding device generally indicated by 42 and comprising two pairs of upper pressure rollers 44, 46 which cooperate with respective pairs of lower pressure rollers 48, 50. The latter are driven by means of a drive chain 54, while the upper rollers 44, 46 are driven by friction through the film 34.

Preferably, as illustrated in FIG. 2, in order to avoid damage to the photosensitive emulsion in the part of the surface designed to produce an image, particularly during prolonged rest or inoperative time intervals of the camera, each of the upper rollers 44, 46 comprises a wheel 56 having a peripheral groove 58 designed to locate a rubber ring 60 of the O-ring type which presses only on the lateral external edge of the film 34, i.e. in a zone of the photographic emulsion which is subjected, as will be described below, to intense preliminary exposure to form a white border. Accordingly, even if the film 34 remains stationary for many hours, the marks left by the rollers 44, 46 have no undesired effect on the quality of the image since the alterations which such marks could make in the photographic characteristics of the emulsion are eliminated by the intense preliminary exposure for forming the border.

With reference now to FIGS. 3 and 4, from the feeding rollers the film 34 is supplied to a preliminary exposure station which comprises a rest plate 56 integral with the frame of the camera below the film 34, and a pressure illuminator 59 (see also FIG. 3) which is located above the film 34 and has its lower face plane and parallel to the rest plate 57. As shown in FIGS. 1 and 3, the illuminator 59 comprises a rectangular case 61, the lower part 62 of which is partly transparent and has a coating 64, e.g. of opaque paint, designed to allow light to pass through a zone not covered by the said coating and corresponding to the desired border. The case 61 contains one or more illuminating lamps 66.

The lower face 62 of the preliminary exposure device is illustrated in FIG. 4. The two dotted zones 65 and 67 are the opaque zones of the said lower wall and protect the photosensitive material from exposure respectively in that part of the surface designed to receive the image of the card with alphanumeric information and that part of the surface designed to reproduce a picture of the owner of the card, the latter operation taking place in accordance with one or other of two operating methods, as described below.

The case 61 of the illuminator is movable by means of a rod 68 extending upwards and designed to cooperate with a cam 70 carried by a shaft 72 pivoted or rotatably mounted at fixed points on the frame of the camera and driven by an electric motor 74. The pressure case 61 is resiliently spaced from the film 34 by means of compression springs 76, 78 which cooperate with rods 80, 82 (not shown in FIG. 1 for clarity) which are guided within channels formed in a block 83 which is integral with the housing 10. Preferably, the rod 68 is not rigidly connected to the case 61 but is spring loaded as shown by means of a spring 85 to protect the film 34.

Furthermore, a cam 84 is keyed on the shaft 72 and has two notches designed to cooperate with a microswitch 86 to stop the motor 74 when the rest position or working position (up and down, respectively) is reached.

The part of the camera described and illustrated up to now operates as follows. Once a new position of the film 34 has entered the preliminary exposure station, during the preparation of each identity card the preliminary exposure device is selectively controlled by means of suitable electrical controls to lower the illumination case 61 and to turn on the illumination lamp for a predetermined time so as to overexpose up to saturation a rectangular peripheral border in addition to an internal partial border, both to limit the external contour of an identity card to be obtained from the film (as will be described below) and to form a limit zone between the data-bearing part of the card (corresponding to part 65 in FIG. 4) and the picture-bearing part of the card (corresponding to part 67 in FIG. 4).

Preliminary exposure with the pressure device produces a border defined with high accuracy and with no lateral scattering of light, thereby avoiding irregularities in the width, coloring and/or definition of the lines.

The film portion is then transferred from the preliminary exposure station to a first exposure station below the oblique mirror 26 where the film portion receives the image of the card 14 which is projected onto it by the objective 24, reflected by the mirror 26. In one of the parts of the film portion which have not been exposed at the preliminary exposure station (i.e. that part corresponding to zone 65) the image of the card 14 can be reproduced so that the film portion the required alphanumeric information. The first exposure station (see also FIG. 5) also contains a masking device comprising a mask 88 which is pivoted on an axis 90 parallel to the film 34 and carrying a pinion 92 meshing with a rack 94 formed in an armature 96 of an electromagnetic solenoid 98. The mask 88, under control of the solenoid 98, is designed to occupy a first rest position (as shown in FIG. 1) where it does not interfere with light beams from the mirror 26 to the film 34, or a working position (shown in FIG. 5) where the mask 88 is rotated through 90° C. about its axis 90 and rests on the film 34 to mask the part of the film portion corresponding to the zone 67 of the preliminary exposure illuminator. If the mask 88 is in a working position during exposure of the film portion the film portion will leave the first exposure station while still having a part of the emulsion not exposed.

From the first exposure station, the film portion is conveyed just beyond a cutter 100, 102 controlled by an electric motor 104 by way of a crank device 106, in a manner well known to persons skilled in the art, to a second exposure station in such a position that an objective 108 (having a shutter not shown) which is designed to receive the image (not visible in the drawings) of the person can focus the image on the part of the film portion which has optionally been masked by the mask 88, thereby forming thereon a latent image of the person.

Of course, although not shown in the drawings for clarity purposes, both the first and the second exposure station comprises fixed masks designed to define a limiting border between the images projected by the respective objectives. In the first exposure station, the fixed mask is a rectangular border whose inner border substantially coincides with the pre-exposed peripheral border of the coupon. In the second exposure station, such fixed mask or border defines at its inner edge the surface of the film portion corresponding to the zone 67 of the preliminary exposure illuminator (FIG. 4). Since the pre-exposed borders on the film portion have been exposed to saturation, or "burnt", the positioning of the film portion with respect to the said fixed masks both in the first and in the second exposure station is not critical because it is irrelevant whether the projected images on the film portion in the two exposure stations fully or partly affect such pre-exposed borders, since they have already been exposed to saturation. This is one of the advantages of the invention, whereby the need for expensive high-precision mechanisms for the positioning of the film portion in successive exposures is avoided.

After possible exposure at the second station, the cutter 100–106 is actuated, thereby separating the film portion, which has been almost completely exposed, from the rest of the film 34 upstream of the cutter. The film portion thus cut out is transferred to a second conveying device comprising upper pressure rollers 112, 114 and corresponding lower pressure rollers 116, 118. The latter rollers are driven by an electric motor by way of toothed wheels 122. The film portion is then forwarded to outlet opening 124 where it will enter a suitable treatment installation. Such installation is preferably of the type described and illustrated in the patent application referred to above, No. 67859-A/76, filed on 13th April 1976 in the name of Osvaldo Fasano, and entitled "Installation for the automatic treatment of single photographs, particularly for automatic cameras for rapidly obtaining photos, identity cards and the like".

The second forwarding device described preferably has two advantageous features. The first of these features is the presence of a freewheel device in the lower pressure roller 116, that is, a device permitting overrunning of roller 116. Such a freewheel device (not shown in the drawings) allows the front edge of the film 34 passing through the cutter to reach the second exposure station to be inserted between the said pressure roller 116 and the upper roller 112 notwithstanding that the motor 120 is stationary, so as to enter the nip between the said rollers ready to be further moved forward from the said second exposure station without the need of actuating the motor 120.

The forwarding device referred to above also comprises a microswitch 126 designed to detect the front edge of the film so as to stop the first forwarding device at the inlet of the camera when the front edge of the film touches the said microswitch.

After the complete description of the structure of the camera, two operating methods will be described, according to which it is possible to obtain an identity card. As already mentioned in the introduction, it is usually desired to obtain the photograph of the owner of the card directly from the person in question positioned in front of the objective 108. In this case, film portion will be exposed to the image of the card 14 at the first exposure station while keeping the mask 88 in the lowered position (shown in FIG. 5) and, after the film portion has moved to the second exposure station, the zone of the film portion previously protected by the mask 88 is exposed to the image of the person.

Sometimes, however, the person is not available for taking his photograph but only his photo taken previously in some other place is available. In this case, the photo will be applied to the card in its respective zone which corresponds to the position of the mask 88 for the image on the film portion in this case, exposure at the first station will take place with the mask 88 in the raised position (as shown in FIG. 1) and no exposure will occur at the second station. The camera can thus prepare an identity card starting either from an image of the person standing in front of the camera, or from his photo.

Of course, the various controls for the various parts of the camera can be automatic in a well known manner for a person skilled in the art so that the operator has only to press one of two pushbuttons for the desired operation so that the film portion is successively exposed in the required sequence. Since the structure of a control cabinet is out of the scope of the present invention and is clearly apparent for a person skilled in the art, a description thereof is deemed unnecessary.

I claim:

1. Photographic apparatus for producing an identity card on photosensitive material with alphanumeric data photographed from a data-bearing card and with a picture of a person photographed selectively either from the actual person or from an existing photograph of the person, the apparatus comprising means for positioning said data-bearing card and for positioning said existing photograph, means for illuminating the data-bearing card and the existing photograph, means for producing images of the data-bearing card and of the existing photograph respectively on first and second predetermined portions of the photosensitive material to said images, selectively operable means for masking said second predetermined portion of the photosensitive material from any exposure to light during exposure of said first predetermined portion of the photosensitive material to the image of the data-bearing card, means for producing an image of the actual person on said second predetermined portion of the photosensitive material, means for selectively producing the image of the person on the second predetermined portion of the photosensitive material from the existing photograph or from the actual person, and selectively operable means for producing a controlled exposure of said second predetermined portion of the photosensitive material to said image of the actual person.

2. Photographic apparatus as defined in claim 1 wherein the said image-producing means are adapted and arranged to produce said images of the data-bearing card and of the existing photograph at one exposure station and said image of the actual person at another exposure station and means for feeding the photosensitive material sequentially to said exposure stations.

3. Photographic apparatus as defined in claim 2 wherein said one exposure station is the first and the other exposure station is the second in the sequence.

4. Photographic apparatus as defined in claim 1 wherein the apparatus is adapted to expose borders of the photosensitive material around said first and second predetermined portions of saturation light.

5. Photographic apparatus as defined in claim 4 wherein said image-producing means are adapted and arranged to produce said images of the data-bearing card and of the existing photograph at one exposure station and said image of the actual person at another exposure station and wherein said apparatus is adapted to feed the photosensitive material sequentially to said exposure stations wherein the apparatus is adapted to expose said borders to saturation light at a third exposure station.

6. Photographic apparatus as defined in claim 5 wherein said third exposure station is a preliminary exposure station and the apparatus is adapted to feed the photosensitive material to said preliminary exposure station before feeding the material sequentially to the first-mentioned two exposure stations.

7. Photographic apparatus as defined in claim 5 wherein the apparatus comprises a movably mounted mask and means for moving said mask into and out of engagement with the photosensitive material, the mask having opaque regions corresponding to said first and second predetermined portions of the photosensitive material, and the mask having light- transmitting regions corresponding to said borders.

8. Photographic apparatus as defined in claim 1 wherein means for feeding the photosensitive material within the apparatus is adapted to engage the photosensitive material only at places outside of said first and second predetermined portions.

9. Photographic apparatus as defined in claim 8 wherein the apparatus is adapted to expose borders of the photosensitive material around said first and second predetermined portions to saturation light and wherein the feeding means is adapted to engage the photosensitive material only at places within said borders.

10. Photographic apparatus as defined in claim 1 wherein the selectively operable masking means to mask said second predetermined portion of the photosensitive material comprises a pivoted mask connected via a rack and pinion mechanism to an electrical solenoid for selectively pivoting the pivoted mask into and out of engagement with the photosensitive material.

11. Photographic apparatus as defined in claim 1 wherein the photosensitive material is a portion of a roll of film and wherein the apparatus includes means for severing said portion from the rest of the film after all the required exposures have been made.

12. Photographic apparatus for producing an identity card ion photosensitive material with alphanumeric data photographed from a data-bearing card and with a picture of a person photographed selectively either from the actual person or from an existing photograph of the person, the apparatus comprising means for positioning said data-bearing card and for positioning said existing photograph, means for illuminating the data-bearing card and the existing photograph, means for producing images of the data-bearing card and of the existing photograph respectively on first and second predetermined portions of the photosensitive material and for controlling exposure of the photosensitive material to said images, selectively operable means to mask said second predetermined portion of the photosensitive material from any exposure to light during exposure of said first predetermined portion of the photosensitive material to the image of the data-bearing card, means for producing an image of the actual person on said second predetermined portion of the photosensitive material, means for selectively producing the image of the person on the second predetermined position of the photosensitive material from the existing photograph or from the actual person, and selectively operable means for producing a controlled exposure of said second predetermined portion of the photosensitive material to said image of the actual person; wherein the said image-producing means are adapted and arranged to produce said images of the data-bearing card and of the existing photograph at one exposure station and wherein the apparatus is adapted to feed the photosensitive material sequentially to said exposure stations; wherein said one exposure station is the first and the other exposure station is the second in the sequence; wherein the apparatus is adapted to expose borders of the photosensitive material around said first and second predetermined portions to saturation light; wherein the apparatus is adapted to expose said borders to saturation light at a third exposure station; wherein said third exposure station is a preliminary exposure station and the apparatus is adapted to feed the photosensitive material to said preliminary exposure station before feeding the material sequentially to the first-mentioned two exposure station; wherein the apparatus comprises a movably mounted mask and means for moving said mask into said out of engagement with the photosensitive material, the mask having opaque regions corresponding to said first and second predetermined portions of the photosensitive material, and the mask having light-transmitting regions corresponding to said borders; wherein means for feeding the photosensitive material within the apparatus is adapted to engage the photosensitive material only at places outside of said first and second predetermined portions; wherein the feeding means is adapted to engage the photosensitive material only at places within said borders; wherein the selectively operable masking means to mask said second predetermined portion of the photosensitive material comprises a pivoted mask connected via a rack and pinion mechanism to an electrical solenoid for selectively pivoting the pivoted mask into and out of engagement with the photosensitive material; wherein the photosensitive material is a portion of a roll of film and wherein the apparatus includes means for severing said portion from the rest of the film after all the required exposures have been made.

* * * * *

UNITED STATES PATENT AND TRADEMARK OFFICE
CERTIFICATE OF CORRECTION

PATENT NO. : 4,139,292
DATED : February 13, 1979
INVENTOR(S) : Luigi Chiesa

It is certified that error appears in the above-identified patent and that said Letters Patent are hereby corrected as shown below:

Column 3, line 27, delete "56" and insert therefore ----57----.

Column 4, line 35, delete "C."

Column 6, line 48, delete the word "of" and insert therefore the word ----to----.

Column 7, line 29, delete "ion" and insert therefore the word ----on----.

Column 8, line 26, delete the word "said" (second occurrence) and insert therefore the word -- and --.

Signed and Sealed this

*Twenty-ninth* Day of *May 1979*

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,139,292
DATED : February 13, 1979
INVENTOR(S) : Luigi Chiesa

It is certified that error appears in the above–identified patent and that said Letters Patent are hereby corrected as shown below:

Column 6, line 20, after the word "material" please insert ----, and for controlling exposure of the photosensitive material----.

Signed and Sealed this

Fourth Day of December 1979

[SEAL]

Attest:

Attesting Officer

SIDNEY A. DIAMOND

Commissioner of Patents and Trademarks